United States Patent [19]

Takase et al.

[11] Patent Number: 5,023,604
[45] Date of Patent: Jun. 11, 1991

[54] COMMUNICATION SYSTEM

[75] Inventors: Akihiko Takase, Tokyo; Yoshitaka Takasaki, Tokorozawa, both of Japan

[73] Assignee: Hitachi, Ltd., Tokyo, Japan

[21] Appl. No.: 233,096

[22] Filed: Aug. 17, 1988

[30] Foreign Application Priority Data

Aug. 24, 1987 [JP] Japan ................. 62-208114

[51] Int. Cl.$^5$ .............................. H04J 3/02
[52] U.S. Cl. .................. 340/825.03; 370/85.8; 370/94.1
[58] Field of Search ...... 340/825.03, 825.04, 340/825.08, 826, 827, 825.5; 370/58, 60, 94, 85

[56] References Cited

U.S. PATENT DOCUMENTS

| | | | |
|---|---|---|---|
| 4,352,180 | 9/1982 | Schulze | 370/58 |
| 4,543,652 | 9/1985 | Amada et al. | 370/58 |
| 4,608,685 | 8/1986 | Jain et al. | 370/85 |
| 4,611,322 | 9/1986 | Larson et al. | 370/60 |
| 4,646,291 | 2/1987 | Perntz et al. | 370/85 |
| 4,646,293 | 2/1987 | Okada et al. | 370/85 |
| 4,739,205 | 4/1988 | Fuhrman | 370/85 |
| 4,750,168 | 6/1988 | Trevitt | 370/85 |
| 4,780,873 | 10/1988 | Mattheyses | 370/94 |

*Primary Examiner*—Sandra L. O'Shea
*Assistant Examiner*—Yuk H. Lau
*Attorney, Agent, or Firm*—Pennie & Edmonds

[57] ABSTRACT

The invention provides a communication method and system for use in a network for digital data exchange/transfer through a circuit switched network. According to the method and system, a call is given the attribute of an intermittent transfer mode, and a device for identifying attributes is provided on network controls in connection paths so that the network control establishes a path only in response to a data transfer request from identified call and releases the path when the call is held on standby for data transfer.

4 Claims, 5 Drawing Sheets

COMMUNICATION SYSTEM

BACKGROUND OF THE INVENTION

The invention relates to a data exchange network and more particularly to a communication system of data exchange network suitable applicable to one-way transmission of large capacity document data and image data.

There are two types of data exchange network, a packet switched network and a circuit switched network. In the packet switched network, since charges are calculated according to the number of packets used, this network is advantageous when the transmission data occurs only occasionally. On the other hand, in the circuit switched network, charging is made according to the time that the circuit is appropriated, and therefore this network is not advantageous for sporadic data transmission. However, the circuit switched network is capable of a transparent transmission and therefore does not require such complicated controls as required by the packet switched network in sending a large volume of data, permitting a rapid and highly efficient data transmission.

To make most of the features of the above two types of communication network, a communication system was devised as disclosed by the Japanese Patent Laid-Open No. 195040/1986. This is shown in FIG. 2. In this example, when a large volume of data is to be transmitted from the packet terminal 21b, a call setup packet sets a flag requesting the use of the circuit switched network. Equipment 27 attached to the packet concentrator 25 identifies this flag to secure a path through the circuit switched network, that is, through the circuit concentrators 23, 23' and circuit switches 24, 24' to an add-on equipment 27', a packet concentrator 25' and a terminal 21b on the receiving side. When the circuit switched network appropriation request flag is not set, the packet transmission is performed through a packet switches 26, 26'.

The above conventional communication technique is effective for conventional data transmission, for example, between TSS terminals and computer and for copying of the contents of magnetic tapes. This conventional system, however, does not include any provision for new types of data transmission that will emerge as high speed, wide band communication network advances.

For example, search of data base is generally performed by a computer that manages the data base. However, as the storage devices such as semiconductor memories and magnetic disks become less expensive, it is more efficient to transmit a large capacity of data to the user side where the search is done by the work station on the user side because this enables diversified processing of data.

As so-called electronic publishing which uses the high-speed wide-band network has come into practical use, there are growing demands for a technique that can transfer several pages of document data or image data without giving an operator an impression of system action delay with respect to the user command.

As mentioned above, in the high-speed wide-band network, it is necessary not only to send a large volume of information in a short period of time but also to transmit it intermittently in response to the user command. While it is possible to cope with the above requirements by using the circuit switched network, it is not economical because the large-capacity high-speed communication line is used only sporadically. On the other hand, the packet switched network has a certain limit to the increased capacity and speed because of the complexity of its control.

SUMMARY OF THE INVENTION

The above object can be achieved by increasing the speed of path setting or routing in the circuit switched network to such an extent that the system can cope with the user's demand for a large capacity data transfer.

In conventional analog telephone networks, the setting of path or routing has been performed by translating the dial pulses into dial information. In such networks, it necessarily takes more than 10 seconds from a call request to the initiation of communication. However, if in the trunk system the signal is transferred through the common channel signaling network and if in the subscriber line the signaling transfer using the common signaling channel of the ISDN interface becomes possible, the time required for the path setting is expected to be approximately one second. This means that as long as there is no halt to the communication line, the user demands can be taken care of with the delay of only about one second even with a type of communication network in which a call request is made every time the user request occurs.

Considering these facts, the above objective is achievable if the probability of the communication line being blocked is reduced and a quicker path setting is obtained. For this purpose, the invention provides an intermittent large capacity data transfer mode (simply referred to as a transfer mode) to the concentrators, switches and terminals used in the conventional circuit switched network.

What constitutes a large percentage of the connection delay time in the path setting which elapses from the moment of a connection demand to a path establishment is a time to establish the subscriber link. This includes power-up times of the originating and terminating network terminations and a time for establishing the frame synchronization of the subscriber link, and the subscriber link setup time is several hundred milliseconds in total. To reduce the link establishment time, the invention maintains, after data transfer, the frame synchronization of the subscriber link which consists of a terminal device, a network termination and a subscriber line terminal. That is, the subscriber link that has entered the transfer mode in response to the user demand maintains the frame synchronization unless the transfer mode is reset. This provision enables the path setting in about several hundred milliseconds.

On the other hand, to reduce the probability of channels being blocked, a channel of the switch, once it is set in the transfer mode, will thereafter be used only in that mode and commonly used by a plurality of transfer mode calls. When the number of calls for that mode exceeds the value determined from the traffic, a new channel is assigned for that mode. The amount of data such as mentioned before that is transferred at one time is almost equal to the capacity of the storage medium and about one hundred M bit at the most. The transfer of this amount of data can be done in less than one second with the high-speed wide-band network. That is, the plurality of calls assigned to one channel will hold the circuit for about one second only and the channel thereafter can immediately transfer other calls. A call that has accessed the channel that is handling other calls is put in a waiting queue of the right of transmission so that it can be transferred immediately after the transfer of the other calls. The length of the waiting queue can be adjusted by the user changing the number of channels assigned to the transfer mode to an allowable extent.

In this way the probability of the channel block can be reduced thereby achieving the above objective.

DESCRIPTION OF THE PREFERRED EMBODIMENTS

Figure 1:
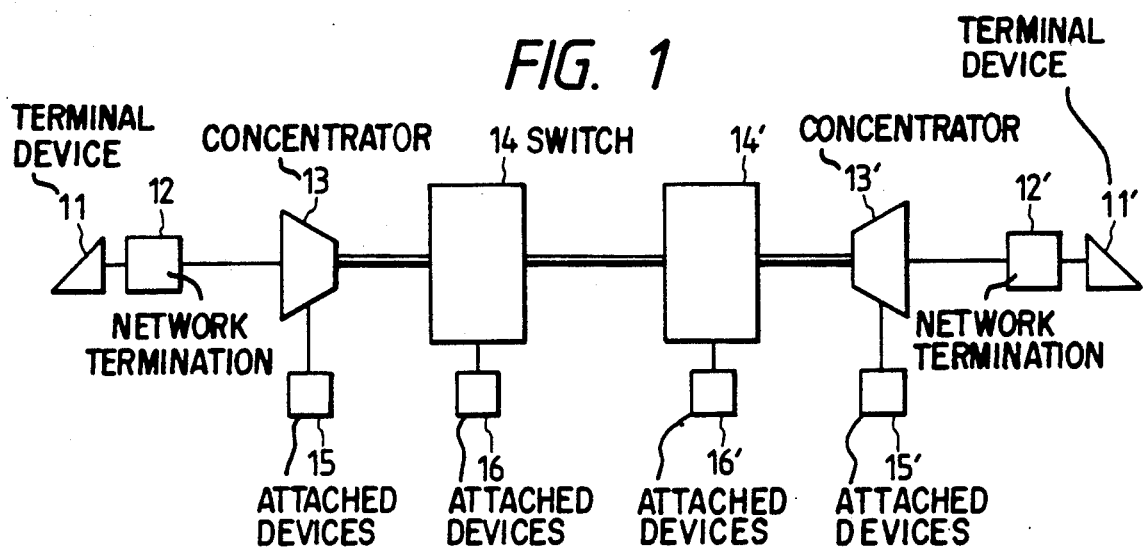
FIG. 1 is one embodiment of the communication system according to the invention.
Figure 2:
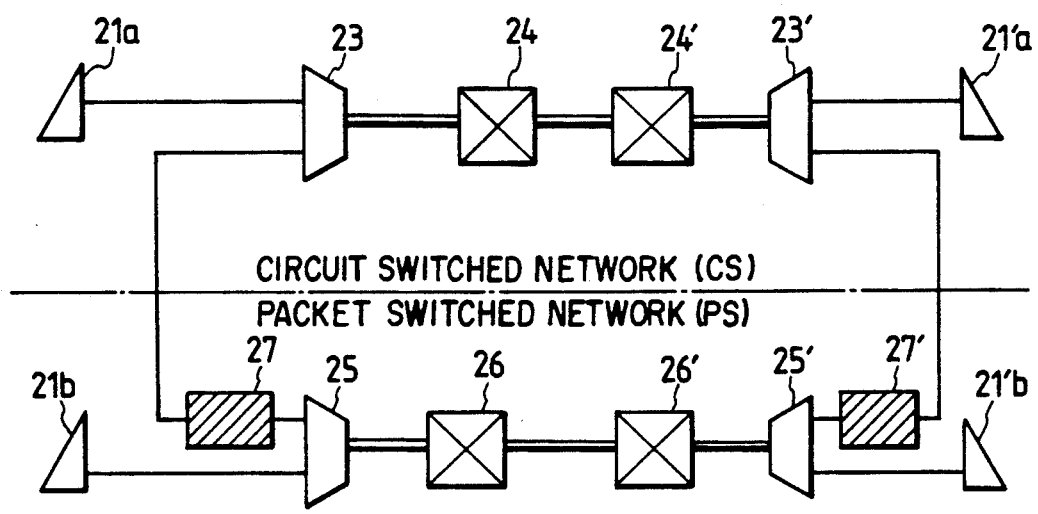
FIG. 2 is an example of a conventional communication system.
Figure 3:
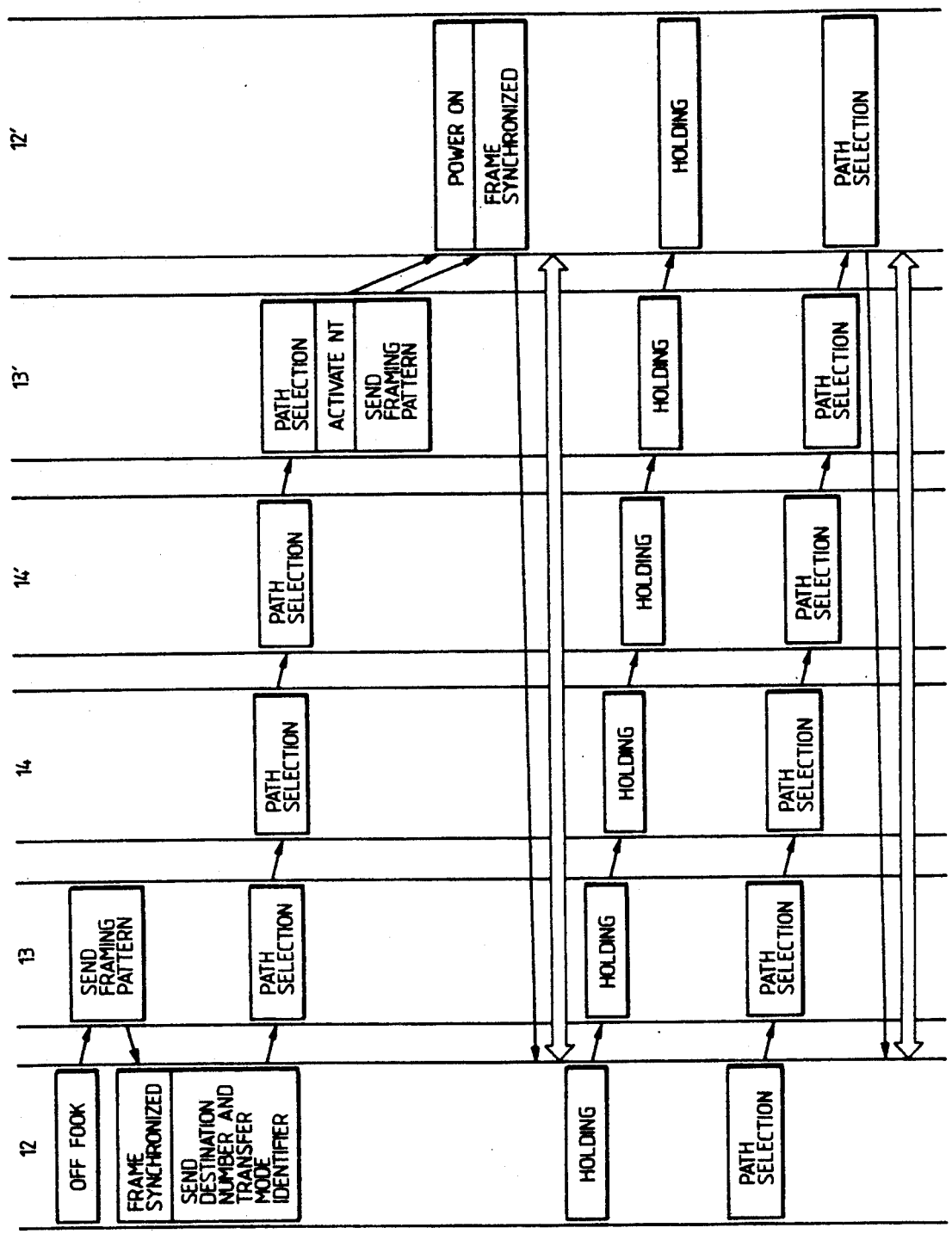
FIG. 3 is a diagram showing the communication sequence for the system of FIG. 1.

FIG. 1 is one embodiment of the invention and FIG. 3 shows one example of a call coupling sequence. In FIG. 1, reference numerals 11, 11' represent terminal devices, 12, 12' network terminations, 13 13' concentrators, and 14, 14' switches. Reference numerals 15, 15' and 16, 16' are attached devices for intermittent large capacity data transmission.

In this embodiment, we will explain a case where a large amount of data is intermittently transmitted from one terminal device 11' to another 11 by the control from the terminal device 11. When a call request is issued from the terminal device 11, the network termination 12 sends the call request to the circuit termination of the concentrator 13. Upon reception of the call request, the concentrator 13 sends a synchronization pattern to the network termination to establish a frame synchronization with the subscriber link. After the subscriber link is synchronized, the network termination 12 sends a destination number and a communication mode identification signal to the network through a subscriber line signaling channel (D channel).

The path selection is made by the concentrator 13, switches 14, 14', concentrator 13' on the receiving side and the destination number. At the same time, the selected channel is registered as the transfer mode in each of the added equipment 15, 15', 16, 16'. In selecting the path, when there is an already registered channel in the desired direction, the call request is put in a waiting queue for the registered channel. When the waiting queue is longer than a specified value, a new channel is assigned.

After the path to the network termination 12' on the receiving side has been selected, the concentrator 13' on the receiving side activates the network termination 12' which then turns its power on. After the subscriber link has been synchronized by the synchronization pattern from the concentrator 13', the concentrator 13' returns a response signal to the terminal device 11 on the control side.

The terminal device 11 on the control side sends a data request signal to the terminal device 11' on the transmission side which then transfers data. After the data is transferred, the control terminal device 11 sends out a hold signal, and the concentrators 13, 13' and switches 14, 14' put their right of use of the terminal devices at the end of the waiting queue.

When the control terminal device 11 requests the data transmission again, it sends a destination number, making the path selection by the concentrators 13, 13' and switches 14, 14'. Upon receiving a path selection completion signal from the transmitting terminal device, the control terminal device causes the sending terminal device to resume the transmission of data. The above sequence is repeated until the call disconnect request is made from the terminal device 11.

Figure 4:
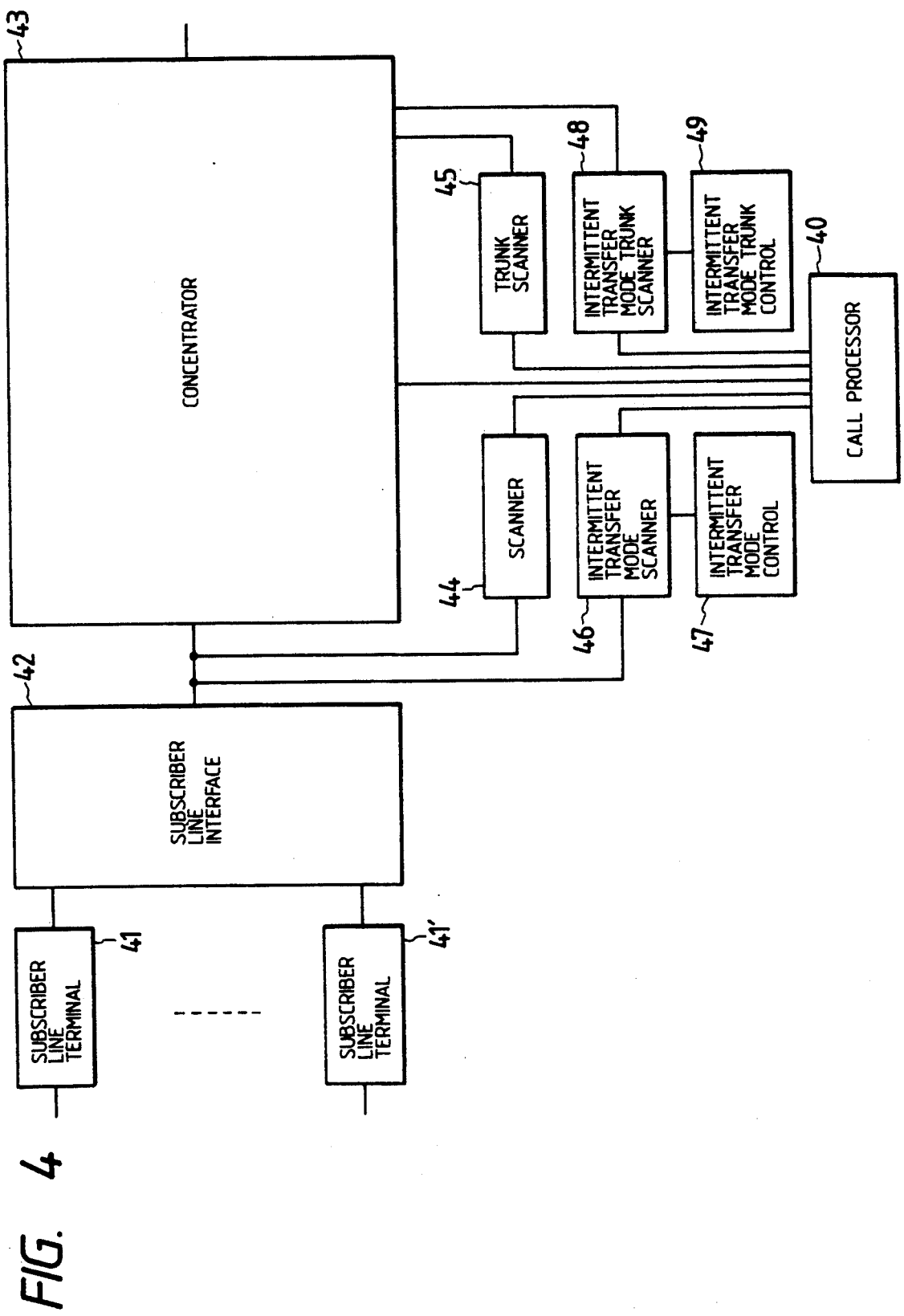
FIG. 4 is a functional block diagram of the system of FIG. 1.

FIG. 4 shows the functional block diagram of the concentrators 13, 13'. In the Figure, reference numerals 41, 41' are subscriber line terminals, 42 a subscriber line interface, 43 a concentrator, 44 a scanner, 45 a trunk scanner, and 46 to 49 added equipment associated with transfer mode.

A call request from a subscriber is accepted by the scanner 44 which is then connected to an idle concentrator. When the call demands a transfer mode, it is registered in a queue by an intermittent transfer mode control 47. An intermittent transfer mode scanner 46, according to the waiting queue, performs interlaced-scanning on the subscriber line interface 42 and, when there is a transfer request, accepts it and sets a path. After the data transfer has been completed and the control terminal device 11 has sent a hold signal, the intermittent transfer mode control 47 puts the right of link use by the terminal device at the end of the waiting queue.

An incoming call, on the other hand, is identified by a trunk scanner 45 and the path to the subscriber line terminal 41 is set by controlling the concentrator. The subscriber line terminal 41 activates the network termination 12' to synchronize the subscriber link. When the incoming call demands the transfer mode, the intermittent transfer mode trunk control 49 identifies a trunk being used in the transfer mode and puts the call at the end of the waiting queue for the transfer mode link. The intermittent transfer mode trunk scanner 48, according to the waiting queue, performs the interlaced-scanning on the trunk to accept the transfer request. According to the request, the call processor 40 controls the concentrator 43 to set a path.

Figure 5:
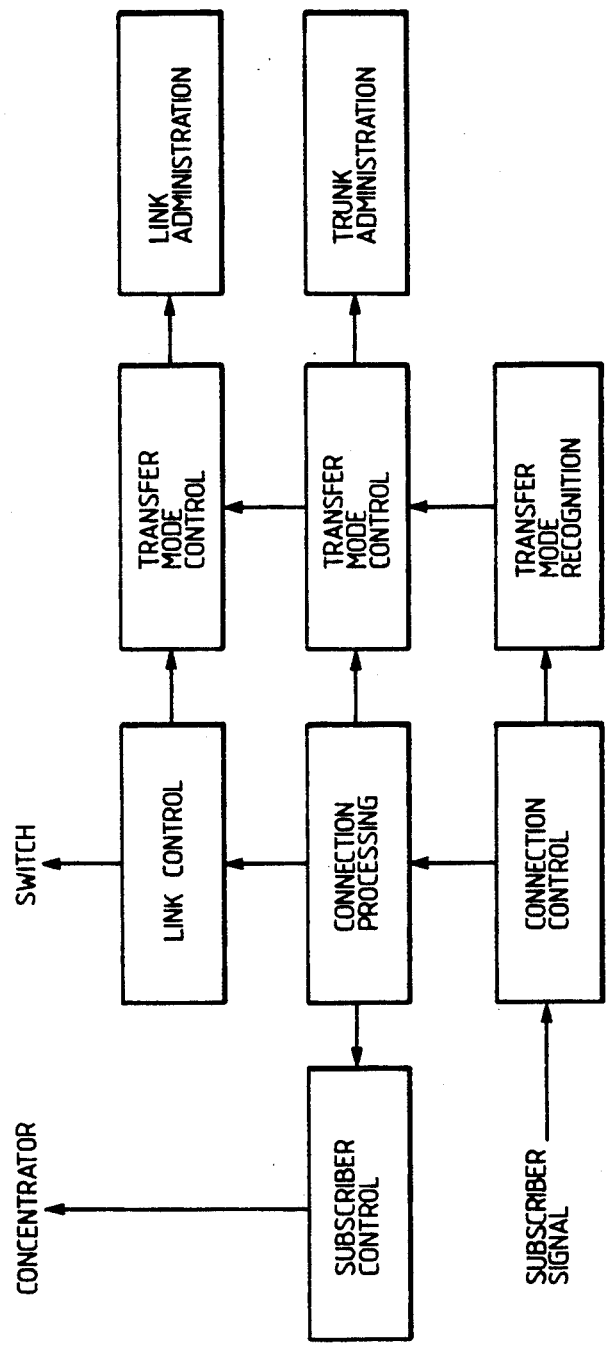
FIG. 5 is a diagram showing the equipment control flow for the system of FIG. 1.

FIG. 5 shows a control flow of this embodiment. The communication mode is identified from the subscriber signal transmitted to the control system. When a path is to be set according to the destination number, the reference to the link administration table and trunk administration table is controlled from the result of mode identification to set a path for the transfer mode. This control is executed in response to the call until the call is disconnected.

As explained above, the invention permits the execution of the transfer mode only by adding the add-on equipment to the existing concentrators and switches in the circuit switched network. Another advantage is that priority control items can be added for desired control with only small changes in software. This facilitates introduction of the system of the invention into the existing communication network.

Figure 6:
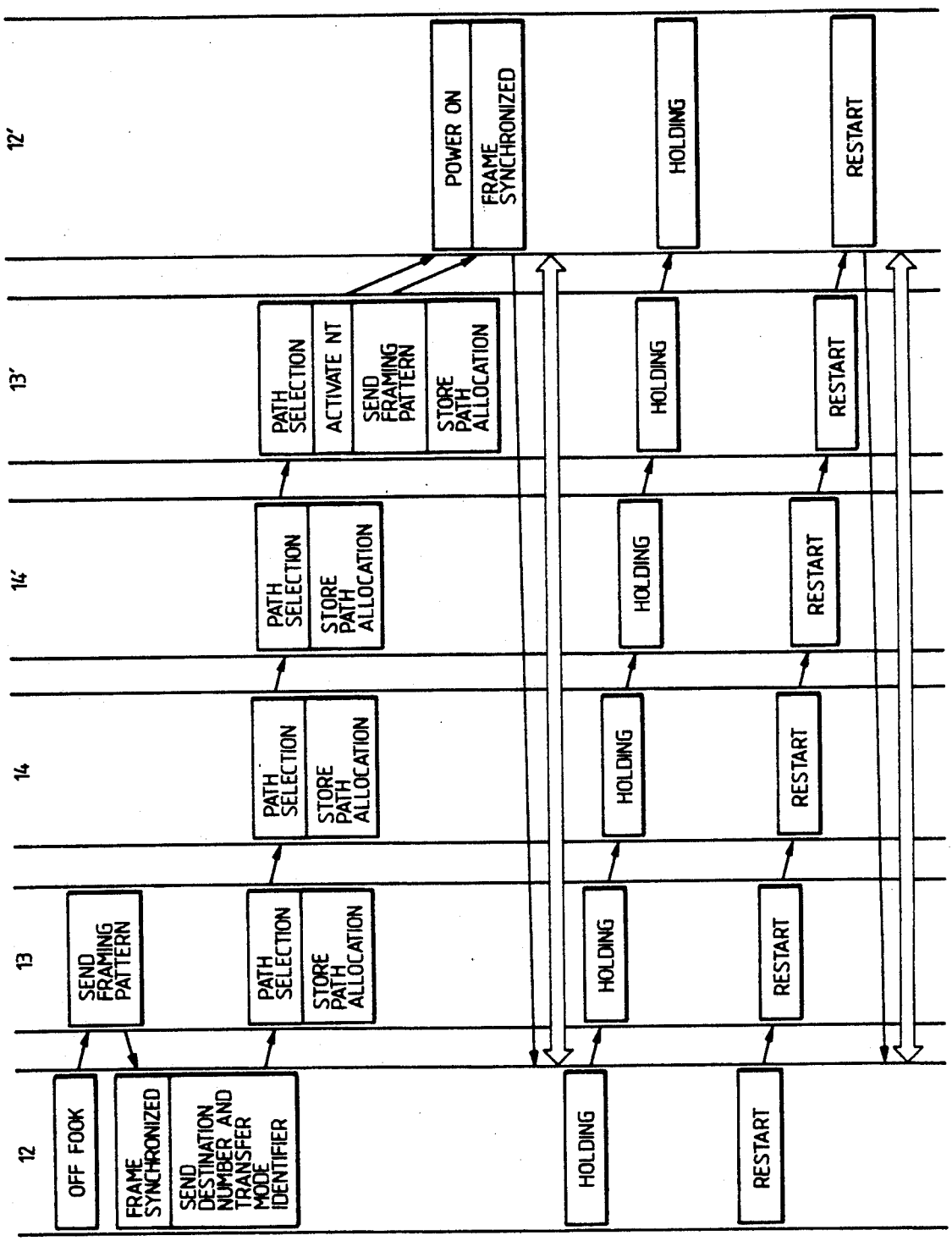
FIG. 6 is a diagram showing the communication sequence for another system according to the invention.

FIG. 6 shows another embodiment of the invention. In this example, the information of the path established at the time of making a call, i.e., the channel control information, is stored in the added equipment. When the path is to be reestablished, the information is read out to control the channel. When the channel is busy, the system waits until the channel is released. That is, the channel is established in a CSMA/CD (carrier sense multiple access/collision detection) procedure.

According to this embodiment, since the channel can be established with a simple control means, the control carried out in each of the network equipment is simple.

Also for a two-way large volume data transfer as opposed to the one-way data transfer described above, the method of this invention can also be suitably applied.

As mentioned above, this invention achieves an increased speed in setting the path by using the common line signal network and the outband signal channels of the subscriber line.

Furthermore, the intermittent large volume data transfer mode is provided to each network equipment so that when the equipment is to be operated in that mode, the frame synchronization of the subscriber line is maintained during the hold state, thereby increasing the speed of reestablishing the path.

The above two features permit the intermittent large volume data transfer through the common use of each network equipment. This ensures the effective utilization of the network equipment, providing more economical communication services.

We claim:

1. A data exchange network system comprising:
   a first group of network terminations, each having a first terminal device;
   a first concentrator connected with each of the network terminations;
   a first switch connected with the first concentrator;
   a second switch connected with the first switch;
   a second concentrator connected with the second switch;
   a second group of network terminations, each having a second terminal device, connected with the second concentrator; and
   attached devices for data transmission connected with the first concentrator, the first and second switches, and the second concentrator, the attached devices preparing a waiting queue of a right of transmission;
   wherein the first concentrator sending a synchronization pattern to a first network termination in the first group after receiving a call request from a first terminal device of the first terminal devices to establish a frame synchronization, said first network termination sending a destination number and a communication mode identification signal to the second concentrator through the first concentrator and the first and second switches to select a path of transmission, the path being registered and maintained as a transfer mode in the attached devices, the second concentrator activating a second network termination in the second group to establish a frame synchronization therewith, said second network termination returning a response signal to said first network termination, the first network termination sending a data request signal to a second terminal device of said second termination, said second terminal device sending data through said path, after receiving said data, said first terminal device sending a hold signal to the first and second concentrator and to the first and second switches to place a right of use of transmission through said path in a waiting queue, said first network termination sending another destination number upon a request of another data transmission by said first terminal device, and thereafter repeating the same steps until the call is reset or disconnected.

2. A data exchange network system according to claim 1, wherein the attached devices have memory means storing information of the path registered as said transferred mode.

3. A communication method for a digital data exchange network having a first group of network terminations, a first concentrator, first and second switches, a second concentrator and a second group of network terminations connected in series, and having attached devices connected to the first and second concentrators and switches, comprising the steps of:
   sending a synchronization pattern from the first concentrator to a first network termination in the first group after receiving a call request from a first network termination to establish a frame synchronization;
   sending a destination number and a communication mode identification signal from the first network termination to via the first and second switches to the second concentrator to select a path of transmission;
   registering and maintaining the path as a transfer mode in the attached devices;
   preparing a waiting queue of a right of transmission so that other call requests from other network terminations are stored in order;
   activating the second network termination of the second group by the second concentrator;
   sending a synchronization pattern from the second concentrator to the second network termination to establish a frame synchronization;
   returning a response signal from the second network termination to the first network termination for the first network termination to receive data through the selected path;
   sending out a hold signal from the first network termination to the first and second concentrators and switches after receiving the data; and
   controlling the first and second concentrators and switches to transfer other data through said selected path when a right of transmission of another network termination exists in the waiting queue.

4. In a communication system for use in a network for transferring and exchanging digital data by means of a circuit-switch network having a first group of network terminals and a second group of network terminals, the improvement comprising:
   a first concentrator connected with each of said first group of terminals;
   a second concentrator connected with each of said second group of terminals;
   means for establishing a call by a first network terminal of the first group for an intermittent data transfer;
   means for selecting a path for the established call;
   means for establishing and storing a waiting queue for access to said path;
   means for holding the established call in a hold state such that said selected path is available for intermittent mode data transmission by said first terminal and by other said first group terminals;
   wherein said first concentrator sends a synchronization signal to a first terminal in said first group upon receiving a call request from said first terminal to establish a frame synchronization, said first terminal sends a destination number and a transfer mode identification signal to the second concentrator to select a path of transmission, said path being held for intermittent mode data transfer, the second concentrator activating a terminal in said second group to establish a frame synchronization therewith, said first terminal sending a data request signal to said second terminal, said second terminal transferring data to said first terminal in response to said request signal, said first terminal placing in said waiting queue means a request for right of access to said path, said first terminal sending another destination number to said second concentrator requesting transfer data through said path, and repeating said steps of placing a request, sending a destination number and transferring corresponding data until said established call is terminated.

* * * * *